(12) United States Patent
Lee

(10) Patent No.: US 12,128,731 B2
(45) Date of Patent: Oct. 29, 2024

(54) HEATING APPARATUS FOR VEHICLE

(71) Applicants: Hyundai Motor Company, Seoul (KR); Kia Motors Corporation, Seoul (KR)

(72) Inventor: Sang Shin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1038 days.

(21) Appl. No.: 17/081,280

(22) Filed: Oct. 27, 2020

(65) Prior Publication Data

US 2021/0394581 A1 Dec. 23, 2021

(30) Foreign Application Priority Data

Jun. 22, 2020 (KR) .......................... 10-2020-0075561

(51) Int. Cl.
*B60H 1/00* (2006.01)
*B60H 1/22* (2006.01)

(52) U.S. Cl.
CPC ....... *B60H 1/00285* (2013.01); *B60H 1/2218* (2013.01); *B60H 1/2225* (2013.01); *B60H 1/2226* (2019.05); *B60H 2001/2268* (2013.01); *B60H 2001/2281* (2013.01); *B60H 2001/2287* (2013.01)

(58) Field of Classification Search
CPC .............. B60H 1/00285; B60H 1/2226; B60H 1/2218; B60H 1/2225
USPC .......................................... 219/202; 165/203
See application file for complete search history.

(56) References Cited

U.S. PATENT DOCUMENTS 5,697,963 A * 12/1997 Augustine ............. A61F 7/0097
607/104

FOREIGN PATENT DOCUMENTS

| JP | 2008038308 A | * | 2/2008 | ............. B60N 99/00 |
| KR | 2017-0079020 A | | 7/2017 | |
| KR | 20180052044 A | * | 5/2018 | ........... B60N 2/5678 |

OTHER PUBLICATIONS

Machine Translation of KR20180052044A (Year: 2024).*
Machine Translation of JP-2008038308-A (Year: 2024).*

* cited by examiner

*Primary Examiner* — Nathaniel E Wiehe
*Assistant Examiner* — Thomas J Ward
(74) *Attorney, Agent, or Firm* — Fox Rothschild LLP

(57) ABSTRACT

A heating apparatus for a vehicle includes: a heat-generating apparatus including a heat-generating portion generating heat and a heat-insulating portion positioned above the heat-generating portion and insulating the heat generated from the heat-generating portion; and a storage apparatus storing the heat-generating apparatus.

12 Claims, 11 Drawing Sheets

HEATING APPARATUS FOR VEHICLE

CROSS REFERENCE TO RELATED APPLICATION

The present application claims under 35 U.S.C. § 119(a) the benefit of Korean Patent Application No. 10-2020-0075561, filed on Jun. 22, 2020, the entire contents of which are incorporated by reference herein.

BACKGROUND

1. Technical Field

The present disclosure relates to a heating apparatus for a vehicle, more particularly, to the heating apparatus that is relatively freely mounted in the vehicle, and configured to deliver heat to passengers through a heat-receiving portion, while being conveniently stored during and after its use.

2. Description of the Related Art

When started in cold weather (e.g., the winter), a vehicle may not heat its interior quickly because its cooling water is not sufficiently heated. Therefore, a radiant heat heater may be installed in the vehicle interior to directly emit radiant heat to a passenger, thereby providing the passenger with improved heating comfort using the radiant heat.

Typical radiant heat heaters for a vehicle may be installed at a bottom of a dashboard in the vehicle interior and installed on a steering column on a driver side, a glove box on a passenger side, a backrest of a front seat and the like to directly emit the radiant heat to the passenger's legs and heat the vehicle interior quickly.

For example, in case of a conventional radiant heater apparatus, a radiant heater apparatus may be installed on a lower surface of the steering column connected to a steering wheel on the driver side, thereby emitting the radiant heat toward the passenger's legs when the passenger sits on a seat. Here, the radiant heater apparatus may include a heat-radiating portion, a heat-generating portion, a terminal and the like, which are formed on a substrate.

However, the conventional radiant heater apparatus has limitations in that the radiant heater apparatus can be mounted only on a position to which a specific indoor trim is applied and its heating effect may be reduced when a distance between the heat-generating portion and the heat-receiving portion is increased depending on a layout. The conventional radiant heater apparatus has another limitation in requiring an additional safety apparatus to prevent an accident due to high temperatures on a surface of the heat-generating portion.

The contents described as the related art have been provided only to assist in understanding the background of the present disclosure and should not be considered as corresponding to the related art known to those having ordinary skill in the art.

SUMMARY

An object of the present disclosure is to provide a heating apparatus for a vehicle that is relatively freely mounted in the vehicle, and configured to deliver heat to passengers through a heat-receiving portion, while being conveniently stored during and after its use.

According to an embodiment of the present disclosure, a heating apparatus for a vehicle includes: a heat-generating apparatus including a heat-generating portion generating heat and a heat-insulating portion insulating the heat generated from the heat-generating portion; and a storage apparatus storing the heat-generating apparatus.

The heat-generating portion may be made of a flexible heating material.

The heat-insulating portion may be made of a flexible material and include a plurality of gas collecting portions, and the gas collecting portions may be connected to each other.

Each of the gas collecting portions may be expanded or contracted as gas is injected thereinto or discharged therefrom.

Each of the gas collecting portions may be expanded when the gas is injected thereinto and have an inclined surface.

The heating apparatus may further include a gas injection apparatus injecting the gas into the heat-insulating portion.

The gas injection apparatus may be an air pump and connected to the heat-insulating portion, and when the gas is injected into the heat-insulating portion through the air pump, each of the gas collecting portions may be expanded.

The gas injection apparatus may include: a gas compression portion compressing the gas; a gas transfer portion connected to the gas compression portion and transferring the gas compressed by the gas compression portion; a gas blocking portion connected to the gas transfer portion and blocking the gas in the gas transfer portion from being discharged; and a fastening portion to which the heat-generating apparatus is fastened.

The gas compression portion may be positioned at a bottom of a vehicle seat or at a seatback, thereby compressing the gas by load of a passenger sitting on the seat.

When the heat-generating apparatus is fastened to the fastening portion, the gas blocking portion may be opened and the gas may be injected into the heat-insulating portion to expand the heat-insulating portion.

The storage apparatus may include: a storage guide portion guiding storage of the heat-generating apparatus when the heat-generating apparatus is stored; and a storage portion having a storage space for storing the heat-generating apparatus.

The storage guide portion may be positioned at an entrance end of the storage apparatus, and an interval in the storage guide portion may be narrower in a direction from one side of the storage guide portion to the storage portion and then be increased again after a predetermined point.

The storage guide portion may have an inclined structure corresponding to the inclined surface of each of the gas collecting portions when the heat-generating apparatus is stored.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a heating apparatus for a vehicle according to embodiments of the present disclosure is described with reference to the accompanying drawings.

Figure 1:
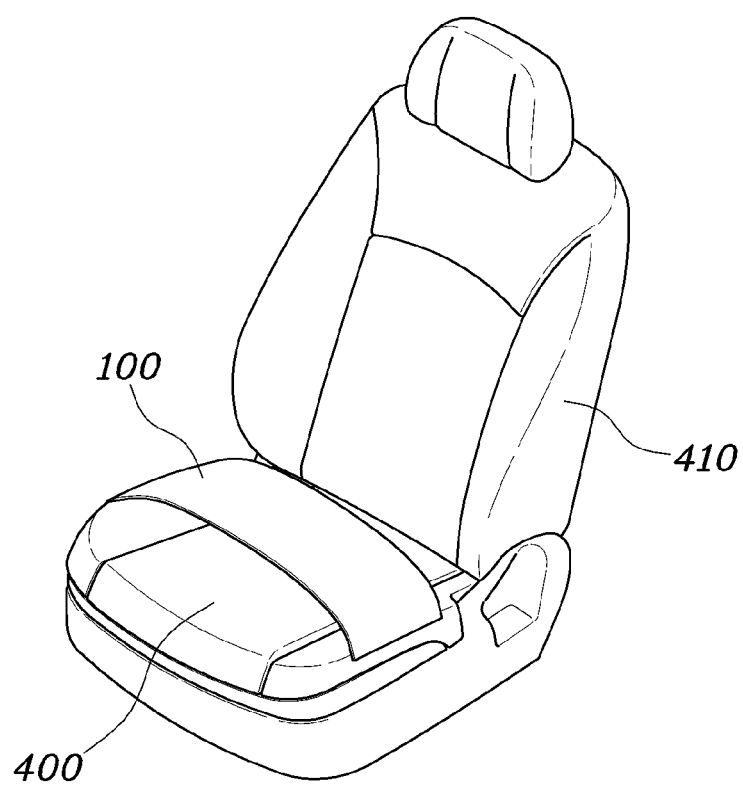
FIGS. 1 and 2 are views showing that a heating apparatus for a vehicle according to an embodiment of the present disclosure is applied.
Figure 2:
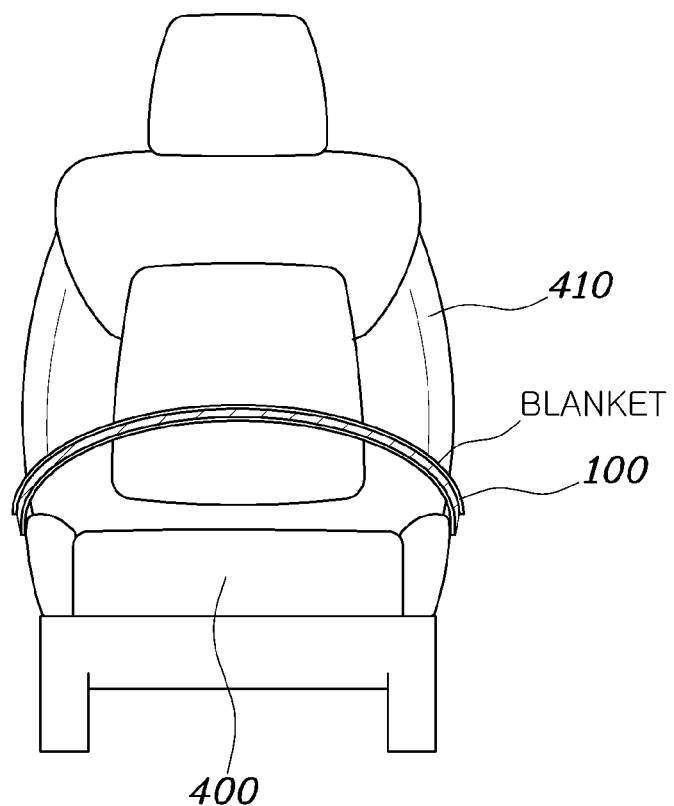
Figure 3:
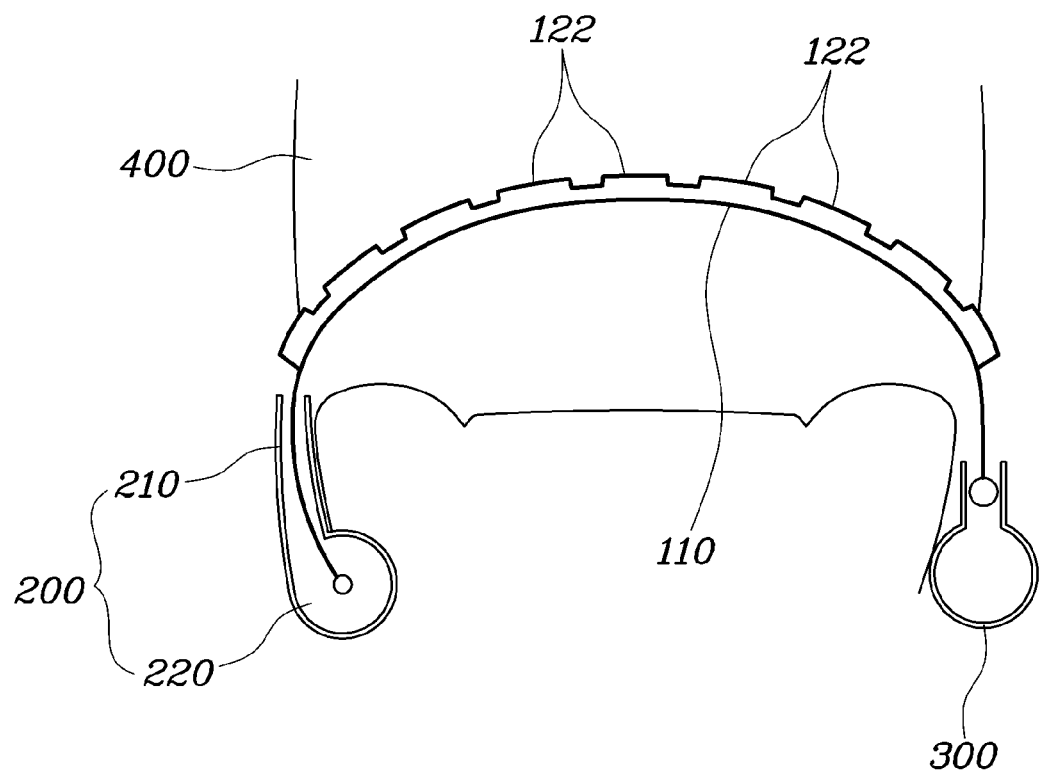
FIG. 3 is a view for describing an operation of the heating apparatus according to an embodiment of the present disclosure when the heating apparatus is used.
Figure 4:
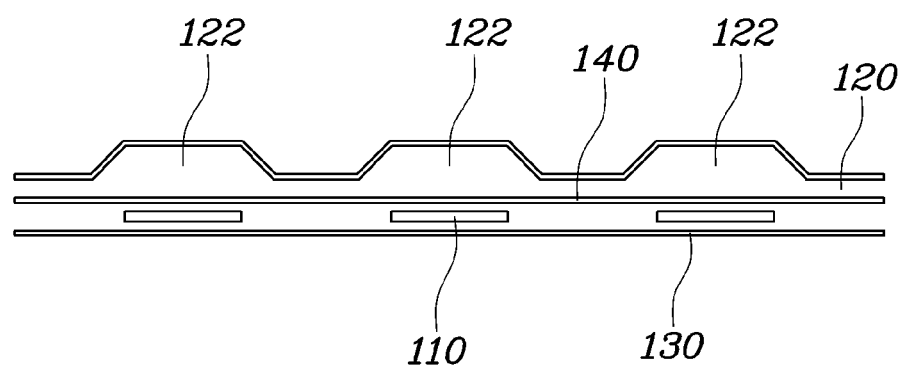
FIG. 4 is a view showing a heat-generating apparatus when the heating apparatus according to an embodiment of the present disclosure is used.
Figure 5:
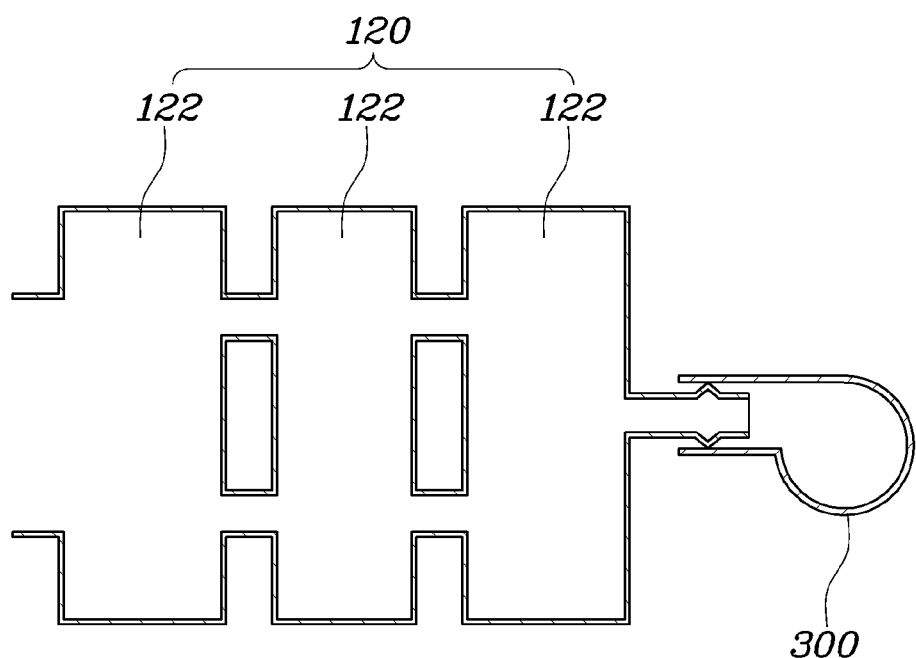
FIG. 5 is a view for describing that air is injected into a heat-insulating portion when the heating apparatus according to an embodiment of the present disclosure is used.
Figure 6:
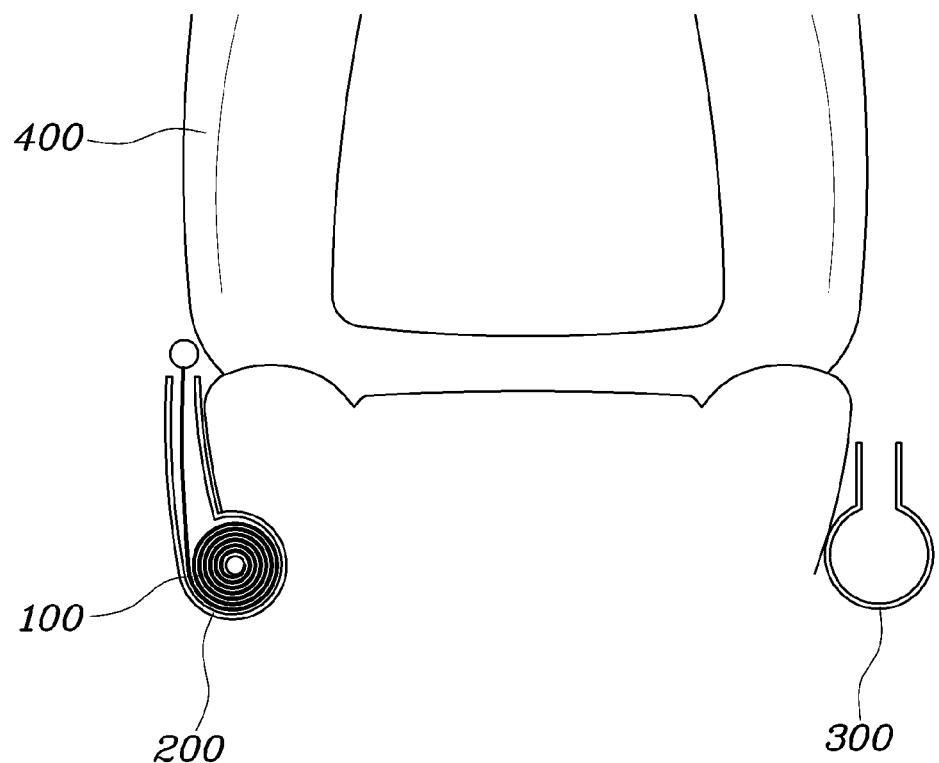
FIG. 6 is a view for describing an operation of the heating apparatus according to an embodiment of the present disclosure after use of the heating apparatus is completed.
Figure 7:
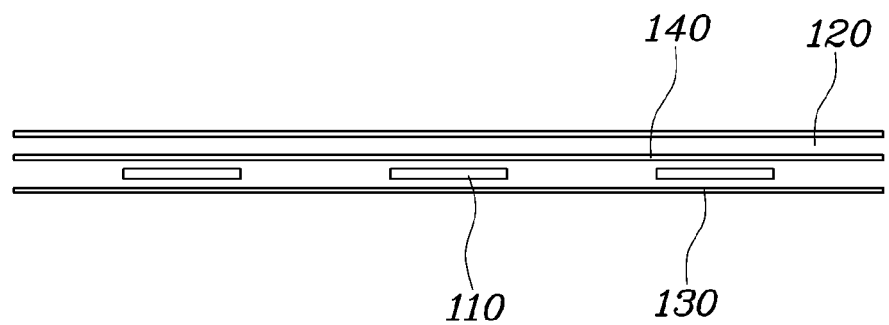
FIG. 7 is a view showing the heat-generating apparatus after the use of the heating apparatus according to an embodiment of the present disclosure is completed.
Figure 8:
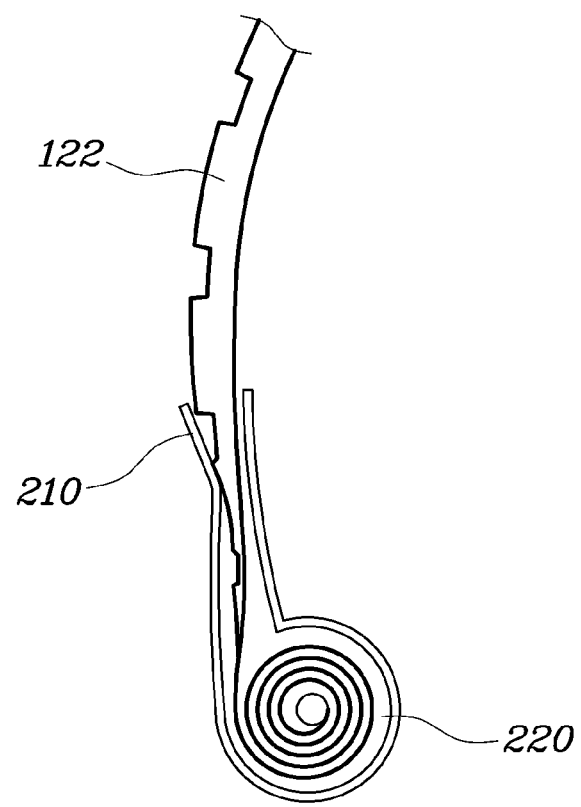
FIG. 8 is a view for describing that the heat-generating apparatus is rolled into a storage portion after the use of the heating apparatus according to an embodiment of the present disclosure is completed.

FIGS. 1 and 2 are views showing that a heating apparatus for a vehicle according to an embodiment of the present disclosure is applied; FIG. 3 is a view for describing an operation of the heating apparatus according to an embodiment of the present disclosure when the heating apparatus is used; FIG. 4 is a view showing a heat-generating apparatus when the heating apparatus according to an embodiment of the present disclosure is used; FIG. 5 is a view for describing that air is injected into a heat-insulating portion when the heating apparatus according to an embodiment of the present disclosure is used; FIG. 6 is a view for describing an operation of the heating apparatus according to an embodiment of the present disclosure after use of the heating apparatus is completed; FIG. 7 is a view showing the heat-generating apparatus after the use of the heating apparatus according to an embodiment of the present disclosure is completed; and FIG. 8 is a view for describing that the heat-generating apparatus is rolled into a storage portion after the use of the heating apparatus according to an embodiment of the present disclosure is completed.

Figure 9:
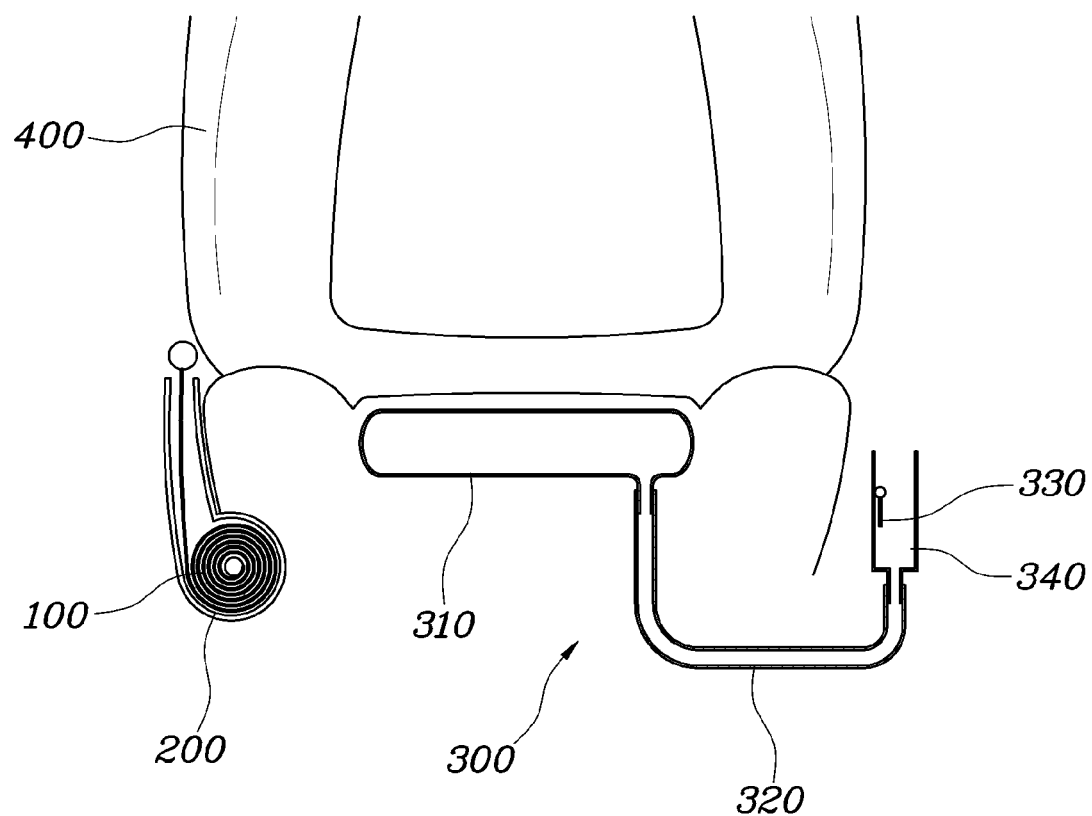
FIG. 9 is a view for describing a heating apparatus for a vehicle according to another embodiment of the present disclosure.
Figure 10:
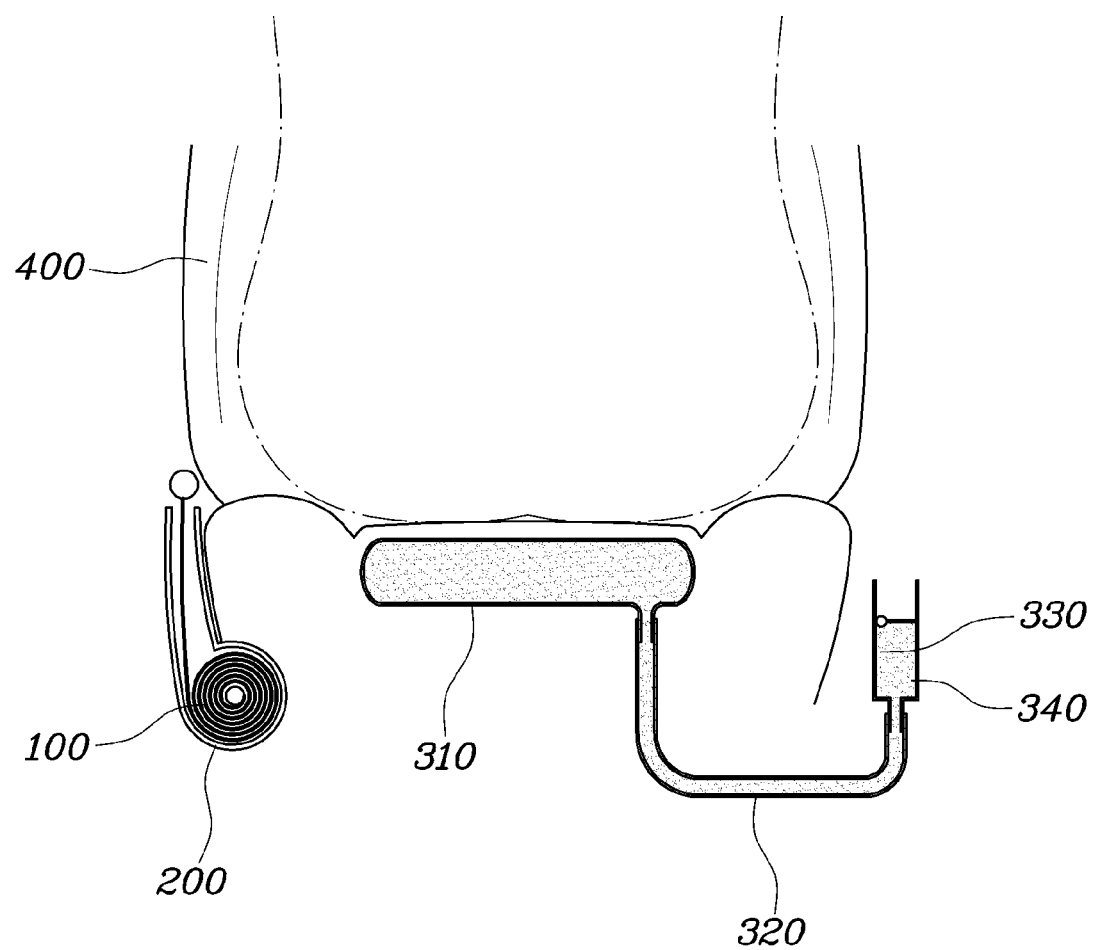
FIGS. 10 and 11 are views for describing an operation of the heating apparatus according to another embodiment of the present disclosure.
Figure 11:
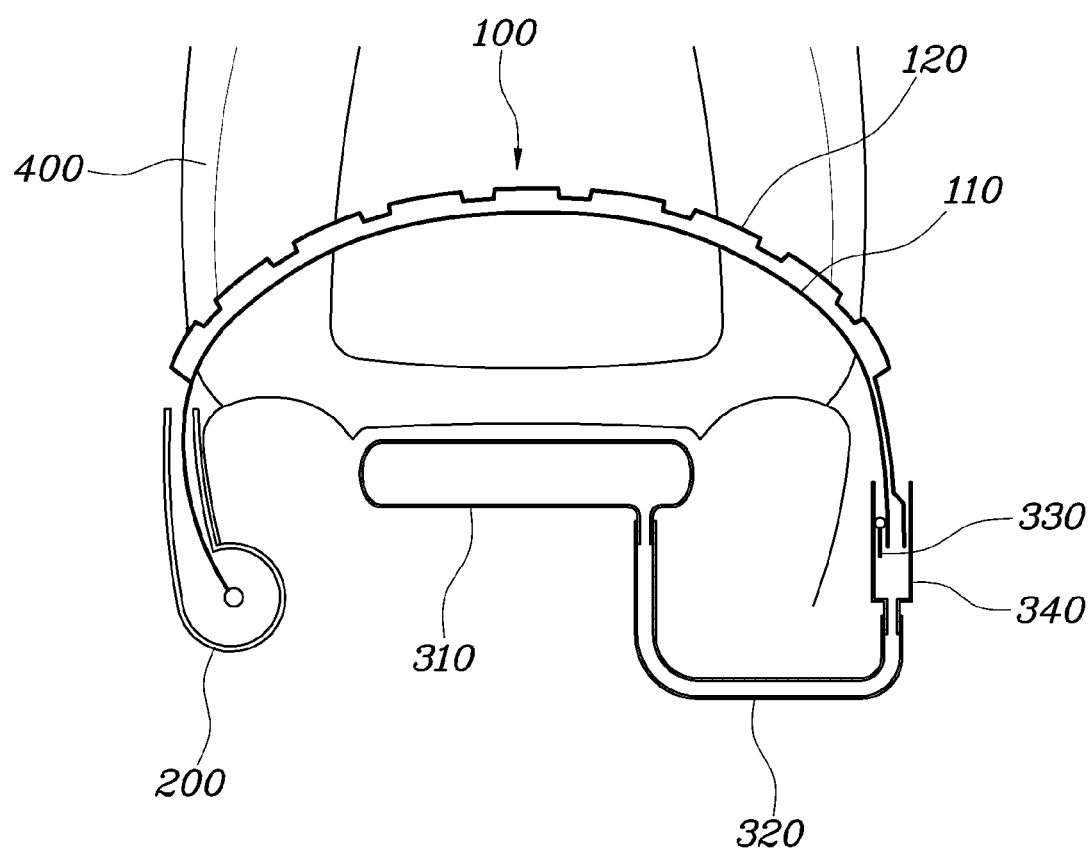
Figure 12:
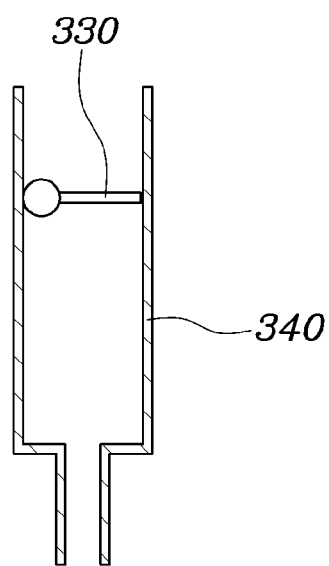
FIG. 12 is a view showing a heat-generating apparatus before being fastened to a fastening portion of the heating apparatus according to another embodiment of the present disclosure.
Figure 13:
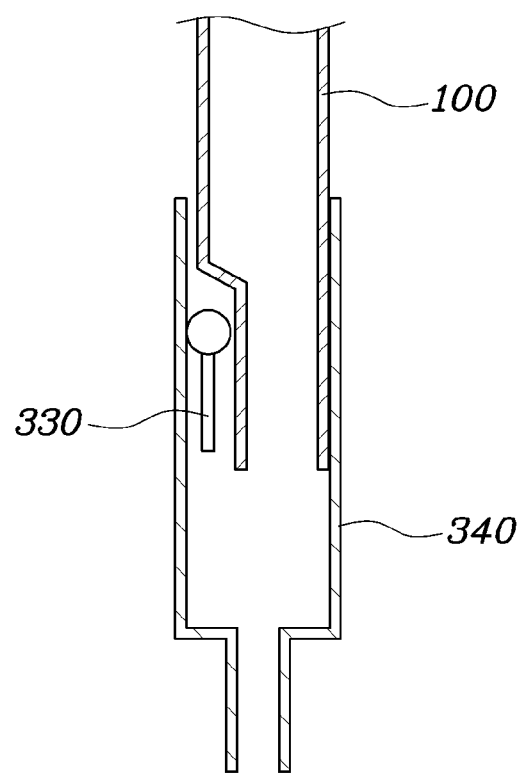
FIG. 13 is a view showing the heat-generating apparatus after being fastened to the fastening portion of the heating apparatus according to another embodiment of the present disclosure.

In addition, FIG. 9 is a view for describing a heating apparatus for a vehicle according to another embodiment of the present disclosure; FIGS. 10 and 11 are views for describing an operation of the heating apparatus according to another embodiment of the present disclosure; FIG. 12 is a view showing a heat-generating apparatus before being fastened to a fastening portion of the heating apparatus for a vehicle according to another embodiment of the present disclosure; and FIG. 13 is a view showing the heat-generating apparatus after being fastened to the fastening portion of the heating apparatus for a vehicle according to another embodiment of the present disclosure.

Referring to FIGS. 1 and 2, the heating apparatus for a vehicle according to an embodiment of the present disclosure may be applied to one or more of a vehicle seat 400 and a seatback 410. However, this application is only an example, and the heating apparatus according to the present disclosure may be applied to another apparatus in the vehicle interior in addition to the seat 400 and the seatback 410.

The heating apparatus according to an embodiment of the present disclosure may include: a heat-generating apparatus 100, and a storage apparatus 200 storing the heat-generating apparatus 100.

Here, the heat-generating apparatus 100 may have a shape of covers or a blanket, depending on the embodiment. That is, the heat-generating apparatus 100 may have a shape of the covers or the blanket, but may be an apparatus configured to generate heat. However, such a shape of the covers or the blanket is only an example, and the heat-generating apparatus 100 may not be limited to a specific shape.

In addition, one end of the heat-generating apparatus 100 may be fixed to a storage portion 220 of the storage apparatus 200; when in use, the heat-generating apparatus 100 may be unfolded from the storage apparatus 200 by pulling the other end of the heat-generating apparatus 100; and when not in use, the heat-generating apparatus 100 may be rolled into and stored in the storage apparatus 200. Here, the heat-generating apparatus 100 may be rolled into the storage apparatus 200 after its use is completed by elastic force of an elastic body positioned in the storage apparatus 200.

In particular, referring to FIG. 4, the heat-generating apparatus 100 may include a heat-generating portion 110 configured to generate heat and a heat-insulating portion 120 positioned above the heat-generating portion 110 and configured to insulate the heat generated from the heat-generating portion 110. Here, a base portion 140 may be positioned between the heat-generating portion 110 and the heat-insulating portion 120. In addition, the heat-generating apparatus 100 may further include a blanket portion 130 positioned below the heat-generating portion 110 and transferring the heat generated from the heat-generating portion 110 to a passenger.

In particular, the heat-generating portion 110 may be made of a flexible heating material. Depending on the embodiment, the heat-generating portion 110 may be made of carbon yarn or a heating film. However, such a material is only an example, and another material may be used as the heat-generating portion 110 of the present disclosure if the material is unfolded when used and flexible enough to be rolled or folded after use, and is capable of generating heat.

The heat-insulating portion 120 may be made of a flexible material, like the heat-generating portion 110. As such, the heat-generating portion 110 and the heat-insulating portion 120 may be made of flexible materials, and thus may be unfolded from the storage apparatus 200 when in use, as shown in FIG. 3, and rolled into and stored in the storage apparatus 200 when not in use, as shown in FIG. 6.

Meanwhile, referring to FIG. 5, the heat-insulating portion 120 may include a plurality of gas collecting portions 122, and the gas collecting portions 122 may be connected to each other. In addition, each gas collecting portion 122 may be expanded as shown in FIGS. 3 and 4 when gas is injected thereinto, and may be contracted as shown in FIG. 7 as the gas is discharged therefrom.

In particular, each gas collecting portion 122 may be expanded when the gas is injected thereinto and have an inclined surface as shown in FIGS. 3 and 4. The following is the reason why each gas collecting portion 122 of the present disclosure is expanded when the gas is injected thereinto. After the use of the heat-generating apparatus 100 is completed, the gas in the heat-insulating portion 120 needs to be discharged, and then the heat-generating apparatus 100 needs to be stored in the storage apparatus 200; here, in order to effectively compress the gas in the heat-insulating portion 120, each gas collecting portion 122 may have an inclined surface and a storage guide portion 210 to be described below may have an inclined structure corresponding to the inclined surface of each gas collecting portion 122. Through this structure, when the heat-generating apparatus 100 is stored, the gas in the heat-insulating portion 120 may be effectively compressed and the gas may thus be efficiently discharged.

Meanwhile, the heating apparatus according to an embodiment of the present disclosure may further include a gas injection apparatus 300 injecting the gas into the heat-insulating portion 120. Depending on the embodiment, the gas injection apparatus may be an air pump, and the air pump and the heat-insulating portion 120 may be connected to each other.

That is, when the gas is injected into the heat-insulating portion 120 through the air pump connected to the heat-insulating portion 120, the gas may be collected in each gas collecting portion 122, and the heat-insulating portion 120 may thus be expanded. Here, an expanded gas layer may serve to insulate the heat generated from the heat-generating portion 110.

The storage apparatus 200 may include: a storage guide portion 210 guiding storage of the heat-generating apparatus 100 when the heat-generating apparatus 100 is stored; and a storage portion 220 having a space for storing the heat-generating apparatus 100.

Referring to FIG. 8, the storage guide portion 210 may be positioned at an entrance end of the storage apparatus 200. In addition, an interval in the storage guide portion 210 may be narrower in a direction from one side of the storage guide portion to the storage portion 220 and then be increased again after a predetermined point. Here, the following is the reason why the interval in the storage guide portion 210 is narrower in the direction toward the storage portion 220 from its one side to the predetermined point and then is increased again after the predetermined point. After the use of the heat-generating apparatus 100 is completed, the air in the heat-insulating portion 120 of the heat-generating apparatus 100 needs to be discharged and simultaneously, the heat-generating apparatus 100 needs to be rolled into and stored in the storage apparatus 200. Here, as the diameter of a space inside the storage guide portion 210 is decreased toward the storage portion 220 while preventing the heat-generating apparatus 100 from being caught at the entrance end of the storage apparatus 200 in a process in which the heat-generating apparatus 100 is rolled into the storage apparatus 200, each gas collecting portion 122 may be effectively compressed, and the gas in the heat-insulating portion 120 may thus be efficiently discharged.

In particular, as shown in FIG. 8, the storage guide portion 210 may have the inclined structure corresponding to the inclined surface of the gas collecting portions 122 when the heat-generating apparatus 100 is stored. Through this structure, when the heat-generating apparatus 100 is rolled into the storage apparatus 200, the gas in the gas collecting portions 122 may be effectively compressed and discharged.

The operation of the heating apparatus according to an embodiment of the present disclosure is described below with reference to FIGS. 1 to 8 based on the structure described above.

First, in case that the heat-generating apparatus 100 is to be used, when the other end of the heat-generating apparatus 100 is pulled to unfold the heat-generating apparatus 100 as shown in FIG. 3, and the heat-generating apparatus 100 is connected to the gas injection apparatus, the gas may be injected into the heat-insulating portion 120 through the gas injection apparatus connected to the heat-insulating portion 120, and the heat-insulating portion 120 may be expanded as shown in FIGS. 3 and 4. In addition, although not shown in detail in the drawings, when the heat-generating apparatus 100 is connected to the gas injection apparatus, power may be supplied to the heat-generating portion 110, and the heat generated through the heat-generating portion 110 may be transferred to the blanket portion 130 to provide the passenger with heat. Here, the power may be supplied to the heat-generating portion 110 as follows: according to an embodiment, when the heat-generating apparatus 100 is connected to the gas injection apparatus, a power terminal of the heat-generating portion 110 and a power terminal positioned in the gas injection apparatus may be connected to each other, and thereby the power may be supplied to the heat-generating portion 110.

In addition, when the use of the heat-generating apparatus 100 is completed, the connection between the heat-generating apparatus 100 and the gas injection apparatus may be released from each other. Here, the heat-generating apparatus 100 may be rolled into and stored in the storage apparatus 200 as shown in FIGS. 6 and 8 by the elastic force of the elastic body which is positioned in the storage apparatus 200 and connected to the one end of the heat-generating apparatus 100.

Meanwhile, in a heating apparatus for a vehicle according to another embodiment of the present disclosure, the gas injection apparatus may include: a gas compression portion 310 compressing the gas; a gas transfer portion connected to the gas compression portion 310 and transferring the gas compressed by the gas compression portion 310; a gas blocking portion 330 connected to the gas transfer portion 320 and blocking the gas in the gas transfer portion 320 from being discharged; and a fastening portion 340 to which the heat-generating apparatus 100 is fastened.

In particular, the gas compression portion 310 may be positioned at a bottom of the vehicle seat 400 or at the seatback 410 according to an embodiment, thereby compressing the gas by load of the passenger sitting on the seat 400.

The gas transfer portion 320 may be connected to the gas compression portion 310 and serve to transfer the air compressed by the load of the passenger. According to an embodiment, the gas transfer portion 320 may be an air tube. However, this type is only an example, an apparatus other than the air tube may be used as the gas transfer portion 320 in the present disclosure as long as the apparatus can serve to transfer the air compressed by the gas compression portion 310.

The gas blocking portion 330 may be connected to the gas transfer portion 320 and serve to block the gas in the gas transfer portion 320 from being discharged. According to an embodiment, the gas blocking portion 330 may be a check valve. However, this type is only an example, and an apparatus other than the check valve may be used as the gas blocking portion 330 in the present disclosure as long as the apparatus can serve to block the gas in the gas transfer portion 320 from being discharged.

When the heat-generating apparatus 100 is used, the fastening portion 340 may be fastened to the one end of the heat-generating apparatus 100, and thereby serving for the heat-generating apparatus 100 to maintain its unfolded state as shown in FIG. 11. In addition, when the heat-generating apparatus 100 is fastened to the fastening portion 340, the gas blocking portion 330 may be opened and the gas may be injected into the heat-insulating portion 120 to expand the heat-insulating portion 120. This configuration is described in more detail with reference to FIGS. 12 and 13 below.

The operation of the heating apparatus according to another embodiment of the present disclosure is described below with reference to FIGS. 10 to 13 based on the structure described above.

First, when the passenger sits on the seat 400, the gas may be compressed at the gas compression portion 310 by the load of the passenger as shown in FIG. 10, the gas may be blocked from being discharged by the gas blocking portion 330, and the high pressure gas may be maintained in the gas transfer portion 320. Here, in case that the heat-generating apparatus 100 is to be used, when the other end of the heat-generating apparatus 100 is pulled and fastened to the fastening portion 340 of the storage apparatus 200 as shown in FIG. 11, the gas blocking portion 330 blocking the gas as shown in FIG. 12 may be opened as shown in FIG. 13, and the gas in the gas transfer portion 320 may be injected into the heat-insulating portion 120 to expand the heat-insulating portion 120. In addition, although not shown in detail in the drawings, when the heat-generating apparatus 100 is connected to the gas injection apparatus, the power may be supplied to the heat-generating portion 110, and the heat generated through the heat-generating portion 110 may be transferred to the blanket portion 130 to provide the passenger with heat. Here, the power may be supplied to the heat-generating portion 110 as follows: according to an embodiment, when the heat-generating apparatus 100 is connected to the gas injection apparatus, the power terminal of the heat-generating portion 110 and the power terminal positioned in the gas injection apparatus may be connected to each other, and thereby the power may be supplied to the heat-generating portion 110.

In addition, when the use of the heat-generating apparatus 100 is completed, the connection between the heat-generating apparatus 100 and the gas injection apparatus may be released from each other. Here, the heat-generating apparatus 100 may be rolled into and stored in the storage apparatus 200 by the elastic force of the elastic body which is positioned in the storage apparatus 200 and connected to the one end of the heat-generating apparatus 100.

The heating apparatus for a vehicle according to the present disclosure may be relatively freely mounted in the vehicle, and configured to provide passengers with heat through the heat-receiving portion, while being conveniently stored during and after its use.

Although the present disclosure has been shown and described with respect to specific embodiments, it is apparent to those having ordinary skill in the art that the present disclosure may be variously modified and altered without departing from the spirit and scope of the present disclosure as defined by the following claims.

What is claimed is:

1. A heating apparatus for a vehicle, the heating apparatus comprising:
   a heat-generating apparatus including a heat-generating portion generating heat and a heat-insulating portion insulating the heat generated from the heat-generating portion;
   a storage apparatus storing the heat-generating apparatus; and
   a gas injection apparatus injecting gas into the heat-insulating portion, wherein the gas injection apparatus includes:
   a gas compression portion compressing the gas;
   a gas transfer portion connected to the gas compression portion and transferring the gas compressed by the gas compression portion;
   a gas blocking portion connected to the gas transfer portion and blocking the gas in the gas transfer portion from being discharged; and
   a fastening portion to which the heat-generating apparatus is fastened.

2. The heating apparatus of claim 1, wherein the heat-generating portion is made of a flexible heating material.

3. The heating apparatus of claim 1, wherein the heat-insulating portion is made of a flexible material and includes a plurality of gas collecting portions, and the gas collecting portions are connected to each other.

4. The heating apparatus of claim 3, wherein each of the gas collecting portions is expanded or contracted as gas is injected thereinto or discharged therefrom.

5. The heating apparatus of claim 3, wherein each of the gas collecting portions is expanded when the gas is injected thereinto and has an inclined surface.

6. The heating apparatus of claim 1, wherein the gas injection apparatus is an air pump and connected to the heat-insulating portion, and when the gas is injected into the heat-insulating portion through the air pump, each of the gas collecting portions is expanded.

7. The heating apparatus of claim 1, wherein the gas compression portion is positioned at a bottom of a vehicle seat or at a seatback, thereby compressing the gas by load of a passenger sitting on the seat.

8. The heating apparatus of claim 1, wherein when the heat-generating apparatus is fastened to the fastening portion, the gas blocking portion is opened and the gas is injected into the heat-insulating portion to expand the heat-insulating portion.

9. The heating apparatus of claim 1, wherein the storage apparatus includes:
   a storage guide portion guiding storage of the heat-generating apparatus when the heat-generating apparatus is stored; and
   a storage portion having a storage space for storing the heat-generating apparatus.

10. The heating apparatus of claim 9, wherein the storage guide portion is positioned at an entrance end of the storage apparatus, and an interval in the storage guide portion is narrower in a direction from one side of the storage guide portion to the storage portion and then increased again after a predetermined point.

11. The heating apparatus of claim 9, wherein the storage guide portion has an inclined structure corresponding to the inclined surface of each of the gas collecting portions when the heat-generating apparatus is stored.

12. A heating apparatus for a vehicle, the heating apparatus comprising:
   a heat-generating apparatus including a heat-generating portion generating heat and a heat-insulating portion insulating the heat generated from the heat-generating portion;
   a storage apparatus storing the heat-generating apparatus, wherein the storage apparatus includes:
   a storage guide portion guiding storage of the heat-generating apparatus when the heat-generating apparatus is stored; and
   a storage portion having a storage space for storing the heat-generating apparatus,
   wherein the storage guide portion is positioned at an entrance end of the storage apparatus, and an interval in the storage guide portion is narrower in a direction from one side of the storage guide portion to the storage portion and then increased again after a predetermined point.

* * * * *